(12) United States Patent
Szymczak et al.

(10) Patent No.: US 10,087,974 B2
(45) Date of Patent: Oct. 2, 2018

(54) PROTECTION CAP ASSEMBLY FOR ONE OR MORE BOLTS

(71) Applicants: David Szymczak, Westfield, IN (US); Brian Mula, Kokomo, IN (US)

(72) Inventors: David Szymczak, Westfield, IN (US); Brian Mula, Kokomo, IN (US)

( * ) Notice: Subject to any disclaimer, the term of this patent is extended or adjusted under 35 U.S.C. 154(b) by 0 days.

(21) Appl. No.: 15/640,497

(22) Filed: Jul. 1, 2017

(65) Prior Publication Data

US 2018/0156261 A1 Jun. 7, 2018

Related U.S. Application Data

(63) Continuation-in-part of application No. 15/370,130, filed on Dec. 6, 2016, now Pat. No. 10,024,354.

(51) Int. Cl.
*F16B 37/14* (2006.01)
*E03D 11/16* (2006.01)

(52) U.S. Cl.
CPC ............. *F16B 37/14* (2013.01); *E03D 11/16* (2013.01)

(58) Field of Classification Search
CPC ...... F16B 37/14; F16B 37/145; F16B 41/005; E03D 11/16
USPC .................................. 411/372.5, 372.6, 373
See application file for complete search history.

(56) References Cited

U.S. PATENT DOCUMENTS

| | | | | | |
|---|---|---|---|---|---|
| 336,063 | A | * | 2/1886 | Palmer | A44B 1/12 24/113 R |
| 2,819,642 | A | * | 1/1958 | Refrigeri | F16B 37/14 411/373 |
| 3,241,427 | A | * | 3/1966 | Bosler | F16B 37/14 4/252.1 |
| 3,362,280 | A | * | 1/1968 | Muller | F16B 21/073 215/317 |
| 3,548,704 | A | * | 12/1970 | Kutryk | F16B 37/14 411/373 |
| 4,659,273 | A | * | 4/1987 | Dudley | F16B 41/005 411/373 |
| 5,642,973 | A | * | 7/1997 | Pretty | F16B 37/14 411/373 |
| 7,658,580 | B1 | | 2/2010 | Conway et al. | |
| 8,366,367 | B2 | | 2/2013 | Matlock et al. | |
| 9,033,633 | B2 | | 5/2015 | Henry | |
| 9,039,339 | B2 | * | 5/2015 | Kuhm | F16B 37/08 411/437 |
| 9,599,141 | B2 | | 3/2017 | Dobbin | |
| 9,650,150 | B2 | | 5/2017 | Zoom et al. | |
| 2002/0192052 | A1 | * | 12/2002 | Ruspa | F16B 37/14 411/431 |
| 2014/0161559 | A1 | * | 6/2014 | Kim | F16B 37/14 411/373 |
| 2014/0373261 | A1 | | 12/2014 | Triantafillos | |

* cited by examiner

*Primary Examiner* — Roberta S Delisle

(74) *Attorney, Agent, or Firm* — Ritchison Law Offices, PC; John D Ritchison

(57) ABSTRACT

A protection cap assembly for fastener assembly for protecting bolts in various places. One embodiment of the device includes: a gripping shaft and a cap. The gripping shaft holds the elongated toilet bolt. The cap is adapted to telescope on the gripping shaft. The components are made from plastic or various durable materials and the cap or cap and extension encloses the gripping shaft. An alternative device has a two part cap and extension with the gripping shaft.

14 Claims, 4 Drawing Sheets

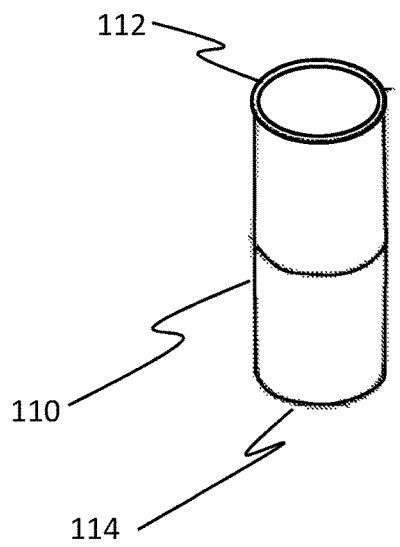
Fig. 6A
Fig. 6
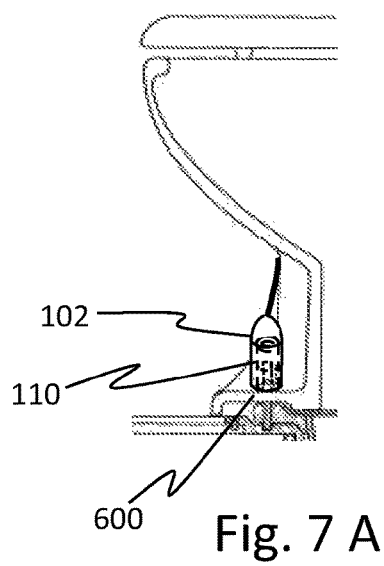
Fig. 7 A
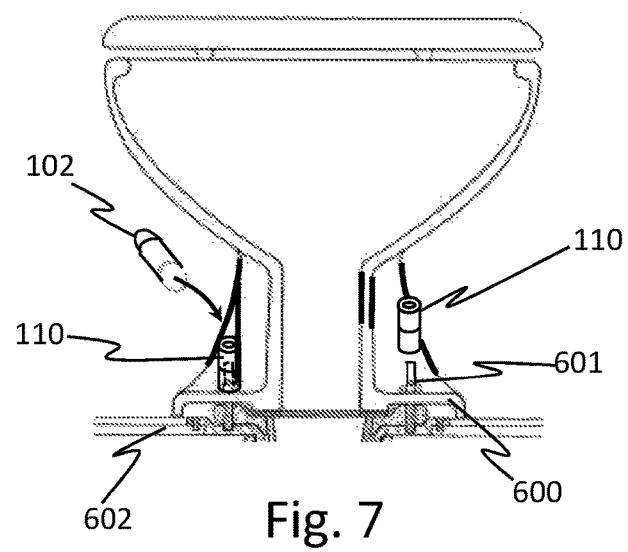
Fig. 7

PROTECTION CAP ASSEMBLY FOR ONE OR MORE BOLTS

CROSS-REFERENCE TO RELATED APPLICATIONS

This application is a Continuation-in-Part [C.I.P.] filed under 37 CFR 1.53(b) and claims the benefit of the original, non-provisional (Regular Utility) U.S. patent application Ser. No. 15/370,130 submitted Dec. 6, 2016. The original application was still active on the date of the submission of this C.I.P. The original application is entitled a "Protection Cap Assembly for One or More Bolts" and was submitted by David Szymczak, et al. The original application is incorporated fully by reference as if it were reproduced here verbatim.

FIELD OF INVENTION

The embodiments herein generally relate to a protection cap assembly particularly, a protection cap for protecting one or more bolts of a toilet. The present disclosure relates to a system or apparatus for covering an exposed nut and bolt assembly for toilets and other exposed nuts and bolts needing cover. Covers for nut and bolt assemblies are used for a variety of reasons, including protecting nut and bolt assemblies from environmental hazards, preventing tampering with a nut and bolt assembly, and for aesthetic purposes.

FEDERALLY SPONSORED RESEARCH

None.

SEQUENCE LISTING OR PROGRAM

None.

BACKGROUND

Description of the Related Art

Fasteners devices have been used onto various surfaces to keep the substrates secure. Most of the fastening devices used, include without limiting, screw, bolt, rivet or the like. The bolts are the most commonly adapted fastening devices. The shank of the bolt, after being fastened, remains exposed. The shank of the bolt affects the aesthetics of the bolt. Already available tools allow these bolts to cut down. Cutting these exposed bolts is time consuming and requires heavy force. Also, the force needed to cut the bolt can damage the surface of the substrate.

Specific for mounting toilet stools, they are typically mounted on two loosely mounted vertical bolts that extend upwardly from a circular flange secured to the floor. The mounting of the base of the toilet involves manually lowering the same so that the bolts extend through apertures in the base. When that is accomplished, nuts are tightened downwardly on the upper ends of the bolts against the base of the toilet to securely hold the toilet in place. To avoid the upper ends of the bolts and the nuts from being exposed, plastic or ceramic caps are typically placed over the upper ends of the bolts. These caps, however, are frequently unsightly and are often displaced during cleaning of the toilet base because they typically extent upwardly a significance distance above the base. Furthermore, the caps often do not completely cover the apertures in the base of the toilet through which the bolts extend. The caps are not watertight, and rust on the bolts soon manifests itself. Putty or adhesive has been placed on the caps to alleviate some of these problems, but that complicates access to the bolts if that ever becomes necessary.

Toilet bolts are critical to the function of the toilet because they keep the fixture in place during use, but the toilet bolts require covers to protect individuals from the exposed threaded portions and make the structure more aesthetically pleasing. However, the caps used to cover the toilet bolts often fall off over time or are themselves ugly. Therefore, there is a need for decorative toilet bolt covers to replace the ugly or dull toilet bolt covers that came with the fixture or to cover the exposed bolt sections of toilets whose bolt covers have been lost. Exposed bolts on toilets can be a hazard, in addition to an eyesore, since such bolts have hard, jagged edges and are potentially rusty because the metal is exposed to a substantial amount of moisture by virtue of its position in the bathroom.

Problem Solved

Accordingly, there remains a need of a safe, easy to fit protection cap assembly for covering bolts exposed in various places, including but not limited to toilets. Caps for covering toilet bolts exist. For example, cap assemblies exist that have a cap that couples to a wafer. In this example, the cap assembly couples to the wafer to cover a toilet bolt that has been trimmed from an off-the-shelf length of about 2.5 inches to a trimmed length of about 2.0 inches. In another example, caps exist that thread on a toilet bolt. Again, and in this example, the cap threads on a toilet bolt that has been trimmed from an off-the-shelf length of about 2.5 inches to a trimmed length of about 2.0 inches. While these caps may cover trimmed toilet bolts, as stated above trimming the toilet bolt is not trivial and takes time. Accordingly, there remains a need in the art for improved toilet bolt caps that do not require trimming the toilet bolts. The present inventors have recognized limitations and drawbacks associated with existing apparatuses for covering nut and bolt assemblies and have also recognized various needs for an apparatus for covering nut and bolt assemblies that does not require tools to install, or that may be uninstalled and reinstalled without losing its ability to stay in place on a nut, or that does not rely on an exposed bolt or stud for securement, singularly or in any combination. When the installer places a nut on the upper end of the bolt to tighten the nut against the base of the toilet stool, the perimeter portion of the stool hides the position of the head of the bolt from the installer. Thus, placing the cover without tools is an additional convenience.

PRIOR ART

In prior art, disclosures have been made, many including more complex devices and systems to protect extended toilet nuts and bolts. Prior art includes U.S. Pat. No. 9,650,150 issued to Zook et al and entitled—Translucent seal cap. This differs from the Protection Cap Assembly for One or More Bolts in that it is designed to be used with proprietary bolts with part of the expanded bolt inside the cap. The design of the applicant works with any standard bolt. The Zook patent uses sealant inside of the cap chamber where the new design does not. Zook teaches a locking mechanism around the proprietary bolt where the new design uses vertical fins for friction upon any bolt shaft. Zook does not telescope to hide debris beneath it and it focuses on a sealed protective bolt end where the new design does not worry about a perfect seal due to the application. The exterior cap is somewhat similar but has nothing taught about the present gripping shaft or locking mechanism. The present new device works on any bolt, telescopes to hide debris and can be quickly added and removed. Another U.S. Pat. No. 9,599,141 issued to Dobbin entitled—Cap With Channels For Forming A Sealed Cavity Around Fastener—is different in several ways from the present design. It differs in that: this patent is designed to use sealant to create the bond where the new design does not use sealant; the new design has vertical fins where Dobbin has horizontal fins; and the new configuration has the ability to fit two sized nuts with the gripping shaft, has a separate cap and shaft where theirs is a single part, and allows the cap to telescope on the gripping shaft covering any washers or spacers under the bolt where Dobbin does not. The new design has done away with the axial ribs engaging the nut faces to stop it from spinning as we do not feel that spinning is a factor. The new design supports two sized bolts where Dobbin is only one. And, the cap telescopes to hide debris and does not depend on sealant to hold it to the nut. Next a U.S. Pat. No. 9,033,633 issued to Henry and entitled—Tall Toilet Bolt Cap—differs in that the new design has the two different sized ends of the shank where Henry invention only offers one size. The new design has a shank that engages the nut where Henry design does not. This new design has vertical ribs to engage the bolt shank where Henry is threaded. The Henry product does not telescope on to the nut where the new one does. Henry cap is a single piece where the new design has two. The new design has several advantages since it does not rely on the bolt shaft to hold the cap to the closet bolt. Therefore, the new design will work where Henry will likely fail. The newly designed cap does not thread onto the bolt so the new design goes on and comes off quicker and easier.

A Patent Application US2014/0373261 by Triantafilos and entitled—Decorative Toilet Bolt Cover—differs in that this design primarily focuses on the aesthetics of the toilet bolt cap. The fastening structures rely on the threads of the bolt or simply fit over the nut tightly. The new designs can be much cheaper than this Triantafilos design as well as more utilitarian. Another U.S. Pat. No. 8,366,367 issued to Matlock et la entitled—Nut and Bolt Cover—differs in that it is made more complexly and from three pieces where ours is made from one. The fastening mechanism is completely different. Further, U.S. Pat. No. 7,658,580 issued to Conway et al and entitled—Toilet Bowl Cover—differs in that this is the traditional toilet bolt cap. The applicant's device differs by not relying on a bottom plastic disc to fasten the toilet cap. Its vertical fins and flexing head will grip the shaft or the nut. With this toilet bolt cap one can have to cut the shank of the bolt off where with the new design one does not. This cap does not telescope to hide debris underneath. This toilet bolt cap does not support two different sizes of closet bolts. This patent has 4 pieces where the new design has two or three. The new design installs much faster as it does not require that the shank be cut like this patent. The new product advantages are that it installs faster, comes off faster, can be reused and is competitive price wise. The new product will work in nearly every situation where this product only works when the shank for the bolt has been cut. Finally, none of the prior art devices show the simple and functional configuration as the new special Protection Cap Assembly for One or More Bolts. The new assembly is not anticipated by prior art. It is believed that this Protection Cap Assembly for One or More Bolts product is unique in its design and technologies. It is believed that this device is made with fewer parts and with improved configurations and physical features to provide more functionality when compared to other currently utilized devices or methods to protect toilet bolts and other nut and bolt components.

SUMMARY

In view of the foregoing, an embodiment herein provides a protection cap assembly for a bolt to protect the bolt. The protection cap assembly includes (i) a clipping ring, (ii) a gripping shaft, and (iii) a hemisphere cap with an elongated end. The gripping shaft is adapted to hold the clipping ring. The gripping shaft includes: (i) a pair of set screws (ii) a first channel, (iii) a second channel, (iv) a first set of one or more fins, and (v) a second set of one or more fins. The pair of set screws is adapted to engage with the bolt. The first channel and the second channel are adapted to hold the clipping ring and engage with the shank of the bolt.

The first set of one or more fins and the second set of one or more fins are arranged inside the gripping shaft. The gripping shaft includes a big inlet to accommodate a big sized bolt and a small inlet to accommodate a small sized bolt. The cap is adapted to enclose the gripping shaft. The cap includes a hole that is adapted to enclose the gripping shaft.

In one embodiment, the gripping shaft, the clipping ring, and the hemisphere cap with an elongated end are made from a plastic or metal. In another embodiment, the gripping shaft includes a pair of set screws. In another embodiment, the gripping shaft, the clipping ring and the cap are made from acrylonitrile butadiene styrene. The cap is adapted to telescope on the gripping shaft.

In yet another aspect, an embodiment herein provides a protection cap assembly for a bolt to protect the bolt. The protection cap assembly includes (i) a clipping ring, (ii) a gripping shaft, and (iii) a hemisphere cap with an elongated end. The first clipping ring is made from acrylonitrile butadiene styrene. The gripping shaft is adapted to hold the clipping ring. The gripping shaft includes: (i) a pair of set screws (ii) a first channel, (iii) a second channel, (iv) a first set of one or more fins, and (v) a second set of one or more fins. The gripping shaft is made from acrylonitrile butadiene styrene. The first channel and the second channel are adapted to hold the clipping ring. The first set of one or more fins and the second set of one or more fins are arranged inside the gripping shaft. The gripping shaft includes a big inlet to accommodate a big sized bolt and a small inlet to accommodate a small sized bolt. The cap is adapted to enclose the gripping shaft. The cap includes a hole that is adapted to enclose the gripping shaft. The cap is made from acrylonitrile butadiene styrene. A preferred aspect shows a protection cap assembly for a bolt to protect the bolt. The protection cap assembly includes (i) a gripping shaft and (ii) a cap. The gripping shaft is adapted with fins, has no set screw or channels for clipping ring. The gripping shaft includes a first set of one or more fins and a second set of one or more fins. The gripping shaft can be made from various plastics. The first set of one or more fins and the second set of one or more fins are arranged inside the gripping shaft and the gripping shaft includes a big inlet to accommodate a big sized bolt and a small inlet to accommodate a small sized bolt. The cap is adapted to enclose the gripping shaft. The cap step ring that is adapted to snuggly secure the gripping shaft. The cap can be made from various plastics.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

OBJECTS AND ADVANTAGES

There are several objects and advantages of the Protection Cap Assembly for One or More Bolts. There are currently no known Protection Cap Assembly that are effective at providing the objects of this invention. The overall uniqueness of the product is the gripping shaft. The gripping shaft will work on two different sized bolts without any adapters as other products require (toilet bolts normally come in ¼ and ⁵⁄₁₆ for example). The Gripping Shaft of the Protection Cap Assembly for One or More Bolts not only engages the shank of the bolt, but also the nut in case the shank has been cut off or is too short. The Gripping Shaft will also allow the telescoping effect to hide any spacers under the nut. Other products either thread onto the shaft or create friction with horizontal fins. The Gripping Shaft uses vertical fins to create the friction and can flex on the nut for additional holding power. Because the product grips both the nut and the bolt and is taller than most products it will work in nearly 99.99% of the situations where the other products only work on a small fraction. Price wise the product should be competitive to the existing industry standard toilet bolt cap. Likewise the product is much faster to install than any competitors product. In a table fashion the Protection Cap Assembly for One or More Bolts offers:

| Item | Advantage |
| --- | --- |
| 1 | Is universal and fits all size bolts for toilets |
| 2 | Is installed without tools |
| 3 | Is able to be installed in close quarters where it is visually difficult to see the exposed bolt |
| 4 | Saves installation time |
| 5 | Eliminates need to cut or grind of extended bolts |
| 6 | Is ergonomic and saves extra bending and twisting by an installer |
| 7 | Can be reused on resetting toilets |

BRIEF DESCRIPTION OF THE DRAWINGS

The embodiments herein will be better understood from the following detailed description with reference to the drawings, in which:

FIGS. 1A through 1C are sketches of an alternative two piece cap 102 and extension 105. This may make the manufacturing somewhat less expensive.

FIGS. 6 and 6A are sketches of the simplified shaft gripper.

FIGS. 7 and 7A are sketches showing the installation of the preferred embodiment of the protection cap assembly for a bolt to protect the bolt.

DESCRIPTION OF THE DRAWINGS—REFERENCE NUMERALS

Figure 1:
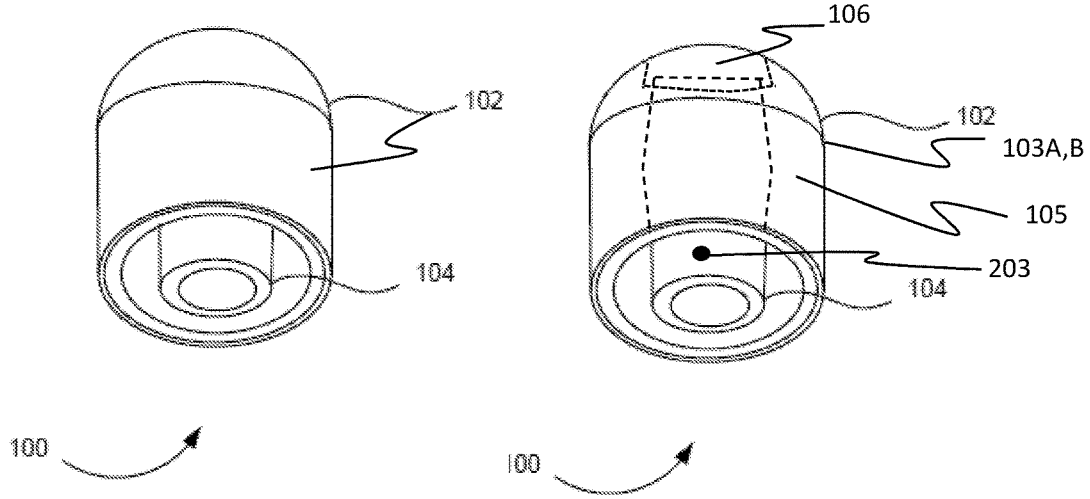
FIG. 1 is a diagrammatic representation of an assembly of a cap and a gripping shaft according to an embodiment herein.
Figure 1:
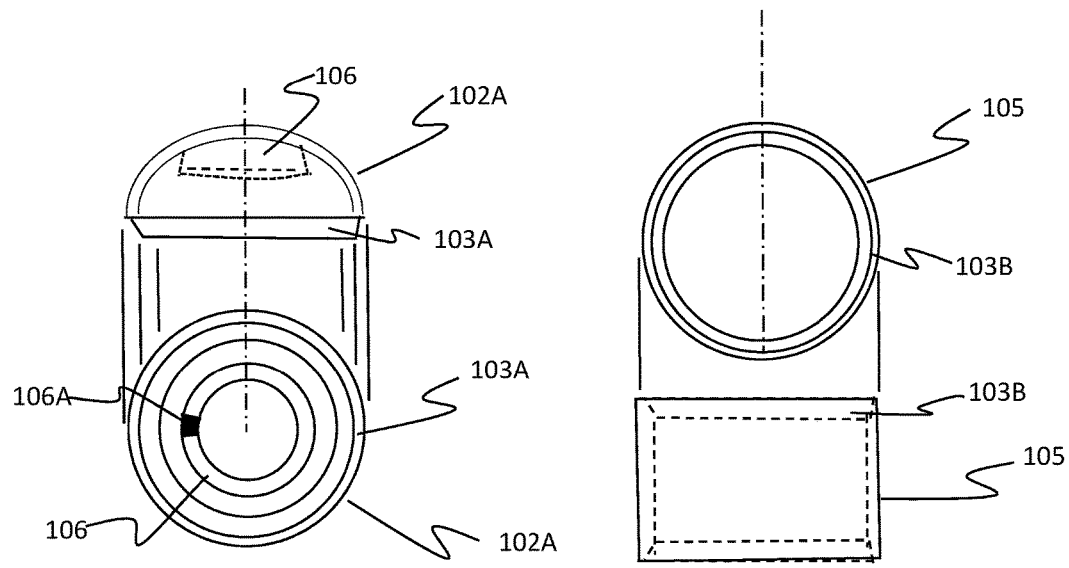

The following numbers refer to the drawings:

| Ref # | Description |
| --- | --- |
| 100 | cap assembly 100 |
| 102 | hemisphere cap with an elongated end 102 |
| 102A | hemisphere cap with a step end to secure with an extension 105 |
| 103A | step feature 103A on cap 102 |
| 103B | step feature 103B on extension 105 |
| 104 | gripping shaft 104 |
| 105 | extension 105 |
| 106 | step ring 106 for gripping shaft 104 |
| 106A | open split 106A on step ring 106 for gripping shaft |
| 110 | gripping shaft 110 with other features |
| 112 | small inlet 112 |
| 114 | big inlet 114 |
| 202 | pair of set screws 202 |
| 203 | aperture 203 for set screws 202 |
| 204 | first channel 204 |
| 206 | second channel 206 |
| 208 | set 208 of one or more fins |
| 210 | second set 210 of one or more fins |
| 302 | clipping ring 302 |
| 400 | perspective view 400 |
| 500 | diagrammatic representation 500 of the cap |
| 502 | hole, opening, aperture 502 |
| 600 | toilet base (flat) flange 600 contiguous with floor 602 |
| 601 | elongated bolt and nut (various sizes) 601 (small) 601A (large) |
| 602 | floor and subfloor 602 |

DETAILED DESCRIPTION OF THE PREFERRED EMBODIMENTS

The present development is a Protection Cap Assembly for One or More Bolts. The present disclosure relates to a system or apparatus for covering an exposed nut and bolt assembly for toilets and other exposed nuts and bolts needing cover. Covers for nut and bolt assemblies are used for a variety of reasons, including protecting nut and bolt assemblies from environmental hazards, preventing tampering with a nut and bolt assembly, and for aesthetic purposes.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The advantages for the Protection Cap Assembly for One or More Bolts 100 are listed above in the introduction. Succinctly the benefits are that the device:

A. Is universal and fits all size bolts for toilets

B. Is installed without tools

C. Is able to be installed in close quarters where it is visually difficult to see the exposed bolt
D. Saves installation time
E. Eliminates need to cut or grind of extended bolts
F. Is ergonomic and saves extra bending and twisting by an installer
G. Can be reused on resetting toilets Accordingly, there remains a need of a safe, and an easy to fit protection cap assembly for one or more bolts exposed in various places. Referring now to the drawings, and more particularly to FIGS. 1 through 7, where similar reference characters denote corresponding features consistently throughout the figures, there are shown preferred embodiments.

FIG. 1 is a diagrammatic representation of an assembly 100 of a cap 102 and a gripping shaft 104 according to an embodiment herein. The assembly 100 includes the cap 102 and the gripping shaft 104. The hemisphere cap 102 with an elongated end includes a hole, opening or aperture 502 (not shown in FIG. 1). The gripping shaft 104 fits into the hole, opening or aperture 502 inside the cap 102. In one embodiment, the cap 102 and the gripping shaft 104 are made from plastic. In another embodiment, the plastic may be acrylonitrile butadiene styrene. See other materials in below Paragraph. FIGS. 1A through 1C are sketches of an alternative two piece cap 102A and extension 105. This may make the manufacturing somewhat less expensive. Shown in these sketches are a hemisphere cap 102A with a step end to secure with an extension 105; a step feature 103A on cap 102; a step feature 103B on extension 105; a gripping shaft 104; an extension 105; a step ring 106 for gripping shaft 104; and an open split 106A on step ring 106 for gripping shaft.

Figure 2:
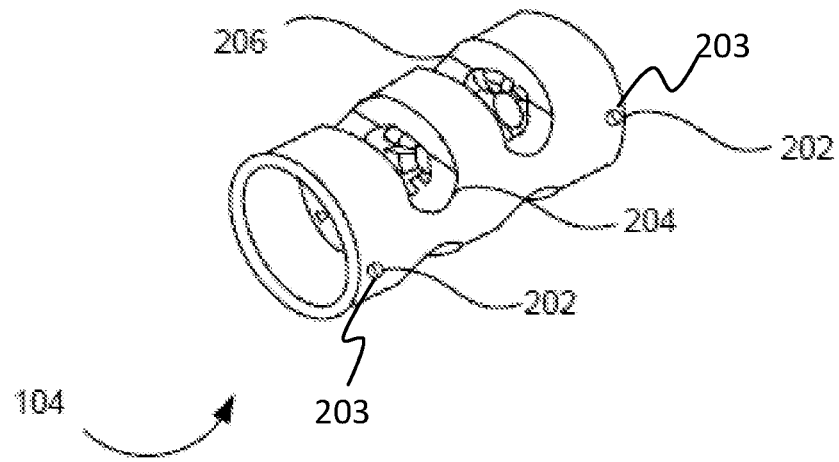
FIG. 2 is a diagrammatic representation of the gripping shaft of FIG. 1 according to an embodiment herein.

FIG. 2 is a diagrammatic representation of the gripping shaft 104 of FIG. 1 according to an embodiment herein. The gripping shaft 104 includes a pair of set screws 202, a first channel 204 and a second channel 206. The first channel 204 and the second channel 206 engage with a clipping ring 302 (not shown in FIG. 2). The two set screws 202 are at both the extreme portions of the gripping shaft 104. In one embodiment, the first channel can engage a first clipping ring 302 and engage; in the alternative the second channel 206 can engage a second clipping ring 302.

Figures 2A, 2B:
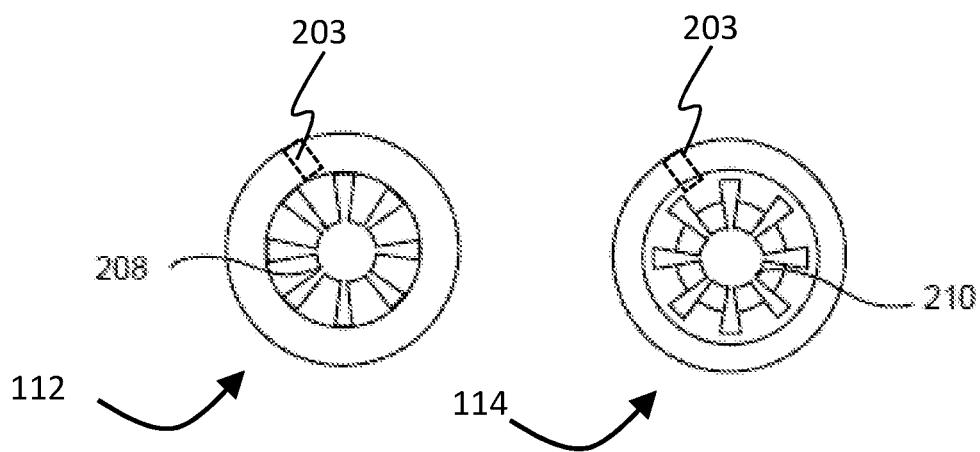
FIG. 2A is a diagrammatic representation of a bottom view of the gripping shaft of FIG. 1 according to an embodiment herein.
FIG. 2B is a diagrammatic representation of a top view of the gripping shaft of FIG. 1 according to an embodiment herein.

FIG. 2A is a diagrammatic representation of a bottom view of the gripping shaft 104 of FIG. 1 according to an embodiment herein. The bottom view of the gripping shaft 104 includes a small inlet 112. The small inlet 112 of the gripping shaft 104 includes a first set of one or more fins 208. The first set of one or more fins 208 improves the holding power of the gripping shaft 104 over the shank of the bolt (not shown in FIG. 2A). In one embodiment, the small inlet of gripping shaft 104 accommodates a small sized bolt 601. The apertures 203 for the set screws 202 are also shown.

FIG. 2B is a diagrammatic representation of a top view of the gripping shaft 104 of FIG. 1 according to an embodiment herein. The top view of the gripping shaft 104 includes a big inlet 114. The big inlet 114 of the gripping shaft 104 includes a second set of one or more fins 210. The second set of one or more fins 210 improves the holding power of the gripping shaft 104 over the shank of the bolt (Not shown in FIG. 2B). In one embodiment, the big inlet of gripping shaft 104 accommodates a big sized bolt 601A.

In another embodiment, the gripping shaft 104 is made from acrylonitrile butadiene styrene.

Figure 3:
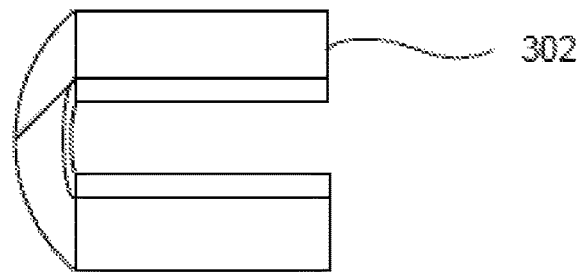
FIG. 3 is a diagrammatic representation of the clipping ring according to an embodiment herein.

FIG. 3 is a diagrammatic representation of the clipping ring 302 according to an embodiment herein. The clipping ring 302 engages with the first channel 204 and the second channel 206 of the gripping shaft 104. In one embodiment, the clipping ring 302 is made from a material selected from plastic, or the like. The clipping ring 302 may hold a big bolt 601A as well as a small bolt 601.

Figure 4:
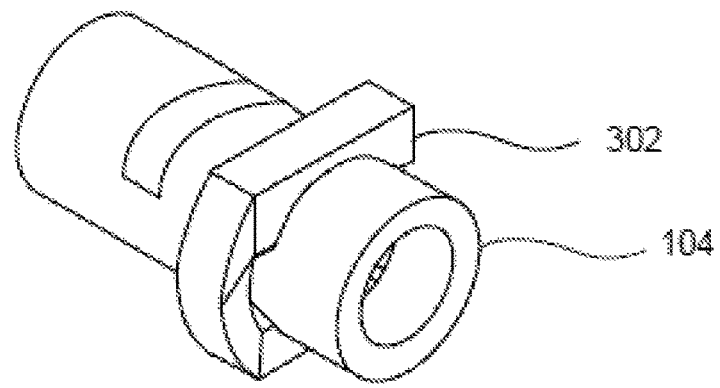
FIG. 4 is a perspective view of the clipping engaged with the gripping shaft of FIG. 2 according to an embodiment herein.

FIG. 4 is a perspective view 400 of the clipping ring 302 engaged with the gripping shaft 104 of FIG. 2 according to an embodiment herein. The clipping ring 302 engages with the first channel 204 of the gripping shaft 104. In another embodiment, the clipping ring 302 may engage with the second channel 206.

Figure 5:
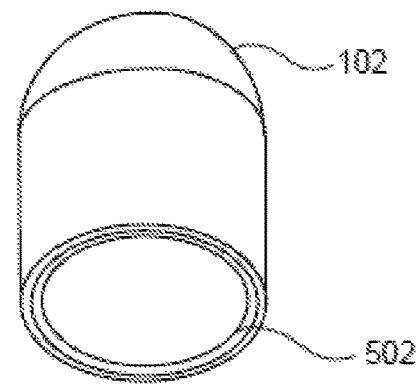
FIG. 5 is a diagrammatic representation of the cap of FIG. 1 according to an embodiment herein.

FIG. 5 is a diagrammatic representation of the cap 500 (102 of FIG. 1 according to an embodiment herein). The cap 102 includes a hole, aperture or opening 502 at the bottom. The hole 502 is adapted to allow the gripping shaft 104 to enter the cap 102. In one embodiment, the cap 102 is made of plastic. In another embodiment, the plastic may be acrylonitrile butadiene styrene. For one skilled in plumbing supplies it is appreciated that the durable materials for the cap 102, extension 105, clip ring 302 and gripper shafts 104, 110 can be made from various composite materials and various plastics including but not limited to nylon, reinforced nylon, urethane, acrylonitrile butadiene styrene (ABS), poly vinyl chloride (PVC), Chlorinated Polyvinyl Chloride (CPVC), pot metal, steel, steel alloys, stainless steel, etc.

FIGS. 6 and 6A are sketches of the simplified shaft gripper. Portrayed in these sketches are: a simplified gripping shaft 110 with other features; small inlet 112; a big inlet 114; a set 208 of one or more fins; and another second set 210 of one or more fins.

FIGS. 7 and 7A are sketches showing the installation of the preferred embodiment of the protection cap assembly for a bolt to protect the bolt. They are discussed in the operations section.

The details mentioned here are exemplary and not limiting. Other specific components and manners specific to describing a Protection Cap Assembly for One or More Bolts 100 may be added as a person having ordinary skill in the field of bolt cover devices and their uses.

Operation of the Preferred Embodiment

The Protection Cap Assembly for One or More Bolts 100 has been described in the above embodiment. The manner of how the assembly operates is described below. One notes well that the description above and the operation described here must be taken together to fully illustrate the concept of the Protection Cap Assembly 100.

A protection cap assembly 100 assembly hides and protects the bolts 601, 601A visible in various places. One or more fins 208 increase the holding power of the gripping shaft 104 over the bolts 601, 601A. Acrylonitrile butadiene styrene increases the durability of protection cap assembly 100. The gripping shaft 104 is designed in order to accommodate bolts of different sizes. The protection cap assembly 100 can be used for any size of bolt 601, 601A. The protection cap 102 also telescopes/slides over the gripping shaft 104, 110 allowing flexibility to engage the surface underneath. The expenses to cut the bolt 601, 601A are highly reduced by using the protection cap assembly 100 with gripping features. The protection cap assembly 100 possesses high aesthetic value. The protection cap assembly 100 is designed to be used in various places without limiting to toilets. Examples of others places to use are: exterior decks, boats with exposed nut and bolts, rustic, unfinished walls to protect occupants from exposed bolts, settings wanting bolts covered for aesthetics, and the like.

FIGS. 7 and 7A are sketches showing the installation of the preferred embodiment of the protection cap assembly for a bolt to protect the bolt 100. Here is shown the cap 102 or cap 102 and extension 105. First are inserted through the sub floor and floor 602 and then the toilet bowl is set onto the bolts 601, 601A through elongated openings in the toilet flat flange 600 (often porcelain of a composite plastic). The flat flange 600 sets level and contiguous with the floor 602. The bolts 601, 601A are placed (sometimes over a washer) and tightened against the toilet flat flange 600. Next the gripper shaft 104 or 110 is placed over the extended bolts 601, 601A. Finally the cap 102 or cap 102 and extension 105 is slid or telescoped over the gripper With this description it is to be understood that the Protection Cap Assembly for One or More Bolts 100 is not to be limited to only the disclosed embodiment of product. The features of the Protection Cap Assembly for One or More Bolts 100 are intended to cover various modifications and equivalent arrangements included within the spirit and scope of the description.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described. All patents and publications mentioned herein, including those cited in the Background of the application, are hereby incorporated by reference to disclose and described the methods and/or materials in connection with which the publications are cited.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

Thus the scope of this invention should be determined by the appended claims and their legal equivalents. Therefore, it will be appreciated that the scope of the present invention fully encompasses other embodiments which may become obvious to those skilled in the art and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A protection cap assembly for a bolt to protect the bolt, wherein said protection cap assembly comprises:
   a gripping shaft, wherein said gripping shaft comprises:
   a big inlet;
   a small inlet;
   a first set of one or more fins arranged inside said gripping shaft; and
   a second set of one or more fins arranged inside said gripping shaft;
   and is adapted to enclose an elongated bolt and nut; and
   a hemisphere cap with an elongated end that is adapted to enclose said gripping shaft, wherein said cap comprises a hole that is adapted to enclose said gripping shaft;
   wherein the gripping shaft fits snugly onto the elongated bolt and the cap telescopes over the gripping shaft and fits snuggly onto the gripping shaft.

2. The protection cap assembly of claim 1, wherein said gripping shaft is made from a material selected from a group of composite materials, plastics, nylon, reinforced nylon, urethane, acrylonitrile butadiene styrene (ABS), poly vinyl chloride (PVC), Chlorinated Polyvinyl Chloride (CPVC), pot metal, steel, steel alloys, and stainless steel.

3. The protection cap assembly of claim 1, wherein the hemisphere cap with an elongated end is made from a material selected from a group of composite materials, plastics, nylon, reinforced nylon, urethane, acrylonitrile butadiene styrene (ABS), poly vinyl chloride (PVC), Chlorinated Polyvinyl Chloride (CPVC), pot metal, steel, steel alloys, and stainless steel.

4. A protection cap assembly for a bolt to protect the bolt, wherein said protection cap assembly comprises:
   a gripping shaft, wherein said gripping shaft comprises:
   a big inlet;
   a small inlet;
   a first set of one or more fins arranged inside said gripping shaft; and
   a second set of one or more fins arranged inside said gripping shaft;
   and is adapted to enclose an elongated bolt and nut; and
   a hemisphere cap that is adapted to enclose top of the gripping shaft, wherein said cap comprises a hole that is adapted to enclose said gripping shaft and a step opposite the hemisphere; and
   an extension adapted with a step at each end to secure with the cap wherein the gripping shaft fits snugly onto the elongated bolt and the cap and extension telescope over the gripping shaft and fits snuggly onto the gripping shaft.

5. The protection cap assembly of claim 4, wherein said gripping shaft is made from a material selected from a group of composite materials, plastics, nylon, reinforced nylon, urethane, acrylonitrile butadiene styrene (ABS), poly vinyl chloride (PVC), Chlorinated Polyvinyl Chloride (CPVC), pot metal, steel, steel alloys, and stainless steel.

6. The protection cap assembly of claim 4, wherein the hemisphere cap is made from a material selected from a group of composite materials, plastics, nylon, reinforced nylon, urethane, acrylonitrile butadiene styrene (ABS), poly vinyl chloride (PVC), Chlorinated Polyvinyl Chloride (CPVC), pot metal, steel, steel alloys, and stainless steel.

7. The protection cap assembly of claim 4, wherein the extension is made from a material selected from a group of composite materials, plastics, nylon, reinforced nylon, urethane, acrylonitrile butadiene styrene (ABS), poly vinyl chloride (PVC), Chlorinated Polyvinyl Chloride (CPVC), pot metal, steel, steel alloys, and stainless steel.

8. A protection cap assembly for a bolt to protect said bolt, wherein said protection cap assembly comprises:
   a clipping ring;
   a gripping shaft that is adapted to hold said clipping ring, wherein said gripping shaft comprises:
   a big inlet;
   a small inlet;
   a pair of set screws that is adapted to engage with a bolt;
   a first channel that is adapted to hold said clipping ring;
   a second channel that is adapted to hold said clipping ring;
   a first set of one or more fins arranged inside said gripping shaft; and
   a second set of one or more fins arranged inside said gripping shaft; and
   a hemisphere cap with an elongated end that is adapted to enclose said gripping shaft, wherein said cap comprises:
   a hole that is adapted to enclose said gripping shaft.

9. The protection cap assembly of claim 8, wherein said pair of set screws comprises two set screws.

10. The protection cap assembly of claim 8, wherein said gripping shaft comprises said big inlet to accommodate a big sized bolt.

11. The protection cap assembly of claim 8, wherein said gripping shaft comprises said small inlet to accommodate a small sized bolt.

12. The protection cap assembly of claim 8, wherein said gripping shaft is made from a material selected from a group of composite materials, plastics, nylon, reinforced nylon, urethane, acrylonitrile butadiene styrene (ABS), poly vinyl chloride (PVC), Chlorinated Polyvinyl Chloride (CPVC), pot metal, steel, steel alloys, and stainless steel.

13. The protection cap assembly of claim 8, wherein said clipping ring is made from a material selected from a group of composite materials, plastics, nylon, reinforced nylon, urethane, acrylonitrile butadiene styrene (ABS), poly vinyl chloride (PVC), Chlorinated Polyvinyl Chloride (CPVC), pot metal, steel, steel alloys, and stainless steel.

14. The protection cap assembly of claim 8, wherein the hemisphere cap with an elongated end is made from a material selected from a group of composite materials, plastics, nylon, reinforced nylon, urethane, acrylonitrile butadiene styrene (ABS), poly vinyl chloride (PVC), Chlorinated Polyvinyl Chloride (CPVC), pot metal, steel, steel alloys, and stainless steel.

* * * * *